United States Patent [19]

Nagy et al.

[11] Patent Number: 4,934,644
[45] Date of Patent: Jun. 19, 1990

[54] ELECTRICAL JUNCTION BOX SUPPORT CLAMP

[76] Inventors: Dennis J. Nagy, 21200 E. Britton Rd., Harrah, Okla. 73045; Timothy J. McGraw, 3620 NW. 65th Terr., Oklahoma City, Okla. 73116

[21] Appl. No.: 295,647
[22] Filed: Jan. 10, 1989
[51] Int. Cl.⁵ .............................................. E04G 3/00
[52] U.S. Cl. ..................................... 248/231; 24/339; 248/218.4; 248/906
[58] Field of Search ............... 248/230, 231, 218.4, 248/219.3, 219.4, 225.31, 231.7, DIG. 7; 24/339, 457; 220/3.9, 3.92

[56] References Cited

U.S. PATENT DOCUMENTS

| | | | |
|---|---|---|---|
| 2,004,182 | 6/1935 | Arey | 248/231 X |
| 2,959,388 | 11/1960 | Fogle | 248/231 |
| 3,374,978 | 3/1968 | Salmon et al. | 248/230 X |
| 3,594,682 | 7/1971 | Oleson | 24/339 X |
| 3,734,438 | 5/1973 | Kautz | 248/230 X |
| 3,894,707 | 7/1975 | Heard | 248/231 |

*Primary Examiner*—Ramon O. Ramirez

[57] ABSTRACT

A slotted support clamp for attaching electrical junction boxes and electrical device boxes rigidly and securely to pipes, comprising a pair of complementary clamping flexible pipe straps which engage securely around a pipe by means of screws and nuts. A device mounting bracket extending outwardly from said pipe straps in the plane parallel to the said pipe surface, with a series of slots and screw guides which provide the means of quickly, easily attaching said electrical box to clamp requiring only screws and nuts for attachment.

4 Claims, 5 Drawing Sheets

4,934,644

ELECTRICAL JUNCTION BOX SUPPORT CLAMP

BACKGROUND OF THE INVENTION

1. Field of the Invention

This invention relates in general to pipe clamps, and in particular to a pipe clamp with a slotted mounting bracket, used to affix electrical junction boxes and electrical device boxes to pipes.

2. Description of Related Art

In the electrical industry there exists requirements to affix electrical junction boxes and electrical device boxes to pipes to support the box. The National Electric Code requires that electrical junction boxes, and electrical device boxes be affixed both rigidly and securely. This requires that the method of attachment will hold the required weight, will not twist or move; and is held in alignment and position. To accomplish the rigid component as required by the National Electric Code, electric boxes are usually welded to a pipe; or attached with two screws, by drilling and tapping the pipe.

These two methods of attachment require additional tools, materials and skills for attachment. These additional tools, materials, and trades increase the construction time, and costs, by complicating the methods and mechanisms used for attachment. The following information is presented to give the reader an understanding and appreciation of the current methods, mechanisms and problems used in attaching devices of this nature to a pipe.

To weld an electrical junction box to a pipe, the electrician, must incorporate a welder by trade, a welding machine, and welding materials. The weldor, welds the back of the junction box to the pipe surface. The heat of the welding process removes the galvanized coating off the electrical box. The galvanized coating was applied to the box for the purpose of corrosion protection. The box must then be primed and painted to replenish its corrosion protection as required by the National Electric Code construction specifications. The welding process also creates rough surfaces inside the back of the box. These rough surfaces may cause a ground fault; if the conductors inside the box rub against them. This is not allowable according to the National Electrical Code. Once the boxes are welded to the pipe, they are considered a permanent fixture, and cannot be removed unless they are cut off with a cutting torch, or beat off with a hammer. Both of these methods destroy the box.

To use the method of drilling and tapping to affix an electrical junction box or device box to a pipe, an electrician uses the pre-punched holes located in the back of all junction, and device boxes, as a template to mark the hole locations on the pipe. Once the pipe is marked, two holes are drilled and tapped into the surface of the pipe. It is difficult to correctly center, mark, and align the back of the box, which is flat, against the round surface of the pipe. The end result of this method is normally a misaligned, or off center attachment of the box. Also, if the box is out of alignment, it can only be corrected by enlarging one hole, and retapping the hole to a larger size screw. This means the box will have to be redrilled from the standard punchsize, to the larger size screw. This method allows the boxes to be removed without damage to the box; but to re-position the box requires additional work, tools, and materials, for proper attachment.

Requirements also exist to be able to attach an electrical box in hazardous areas, where flammable, or electrical spark producing equipment are not allowed. In this case, the fire department must be contacted and may require that the area be evacuated, vented, or the area shut down for safety, and to meet electrical and safety codes.

There is therefore a need to provide a method and mechanism that will attach an electrical junction or device box to a pipe, which provides the following objects, advantages, and features for attachment:

(a) Requires only one mechanism for the support of the box;
(b) Requires only the means of screws, nuts and a screwdriver for attachment of the clamp to the pipe, and attachment of devices to the clamp;
(c) Provides the method to quickly, easily and correctly attach the box, with the first attempt, without having to reweld, or redrill and retap;
(d) Provides a secure and rigid support for the box;
(e) Provides a method to quickly, easily and safely attach the box in hazardous areas, without having to evacuate or shut down the area;
(f) Provide a method to quickly and easily unfasten, and reattach the box;
(g) Provide a method to easily adjust and center the box on the pipe;
(h) Eliminate the use of welding, drilling and tapping, and the tools, materials, damage and increased costs associated with these methods for attachment.

These objects as well as other objects, advantages and features will become apparent from the discussion that follows, and are achieved according to the present invention of an Electrical Junction Box Support Clamp.

SUMMARY OF THE INVENTION

In fulfillment and implementation of the previously related objects this present invention is a unique slotted support clamp that quickly and easily attaches to a pipe or pipe standard; and provides both the mechanism and method of attaching electrical junction boxes and electrical device boxes quickly and easily to the mounting plate of the support clamp for positioning, centering, and securing of these devices to the pipe. A main feature of this support clamp is the capability of requiring only one mechanism for the support and attachment of said devices, while also providing a method of mounting that accepts the wide range of objects, advantages, and features as listed below:

(a) Requires only one mechanism for attachment of the electrical box;
(b) Requires only the means of screws, nuts and a screwdriver for attachment of the clamp to the pipe, and attachment of the box to the clamp;
(c) Provides a method to quickly, easily and correctly attach the box, with the first attempt;
(d) Accepts the sliding of screws and nuts into the edge of the mounting slot for quick and easy attachment;
(e) Allows for attachment of screw and nut assemblies after they have been inserted into the back of the box, and after the nut has been screwed on the end of the screw;
(f) Allows for easy positioning, centering, alignment of the box, by loosening the screws;
(g) Accepts any screw size, type, or thread within design range;
(h) Accepts any linear screw hole pattern on the back of a box, within design range;

(i) Provides a rigid and secure attachment as required by National Electrical Codes;
(j) Allows for unfastening or refastening of boxes, without damaging the box;
(k) Allows for easy adjustment and centering of the box;
(l) A method that does not require any welding, materials or tools for attachment;
(m) A method that does not destroy the galvanized coating of the box during attachment as with welding;
(n) A method that does not produce sharp edges inside the back of the box, as with welding, and break the National Electrical Codes;
(o) Does not produce the debris due to welding, drilling or tapping;
(p) Does not require re-welding due to misalignment;
(q) Does not require any drilling or tapping, or the materials and tools required with these skills;
(r) Does not require any redrilling to misalignment;
(s) Allows for easy, quick and safe attachment in areas of a hazardous nature where spark producing tools and equipment are prohibited.

DESCRIPTION OF THE PREFERRED EMBODIMENT

Figure 1:
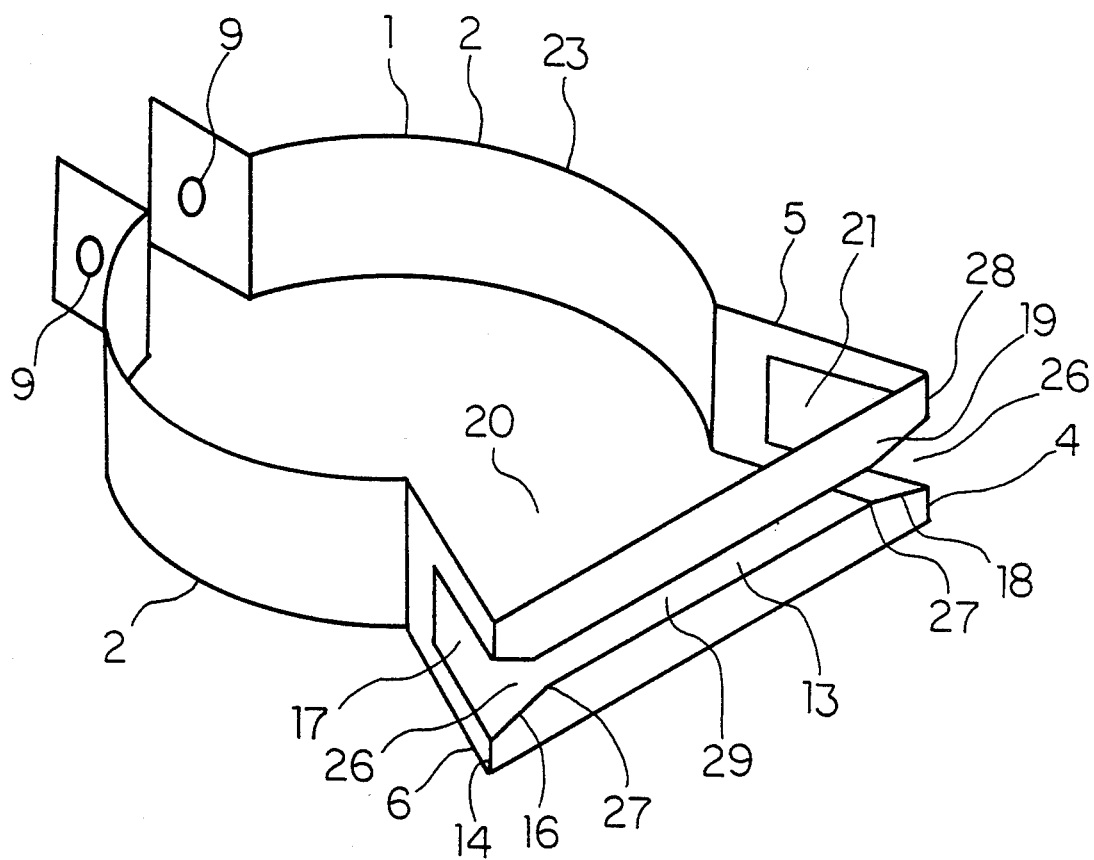
FIG. 1 is an enlarged, perspective of the slotted support clamp in accordance with the present invention.
Figure 2:
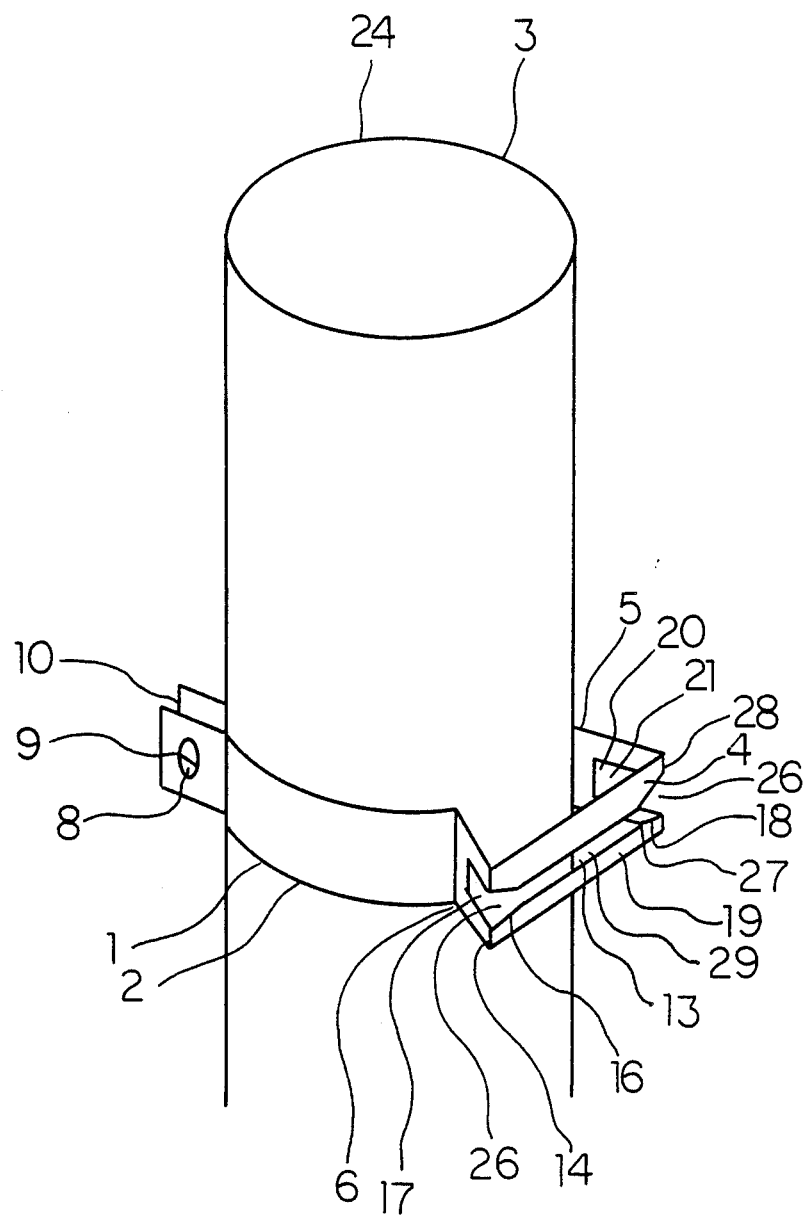
FIG. 2 illustrates a perspective of the clamp attached to a pipe.
Figure 3:
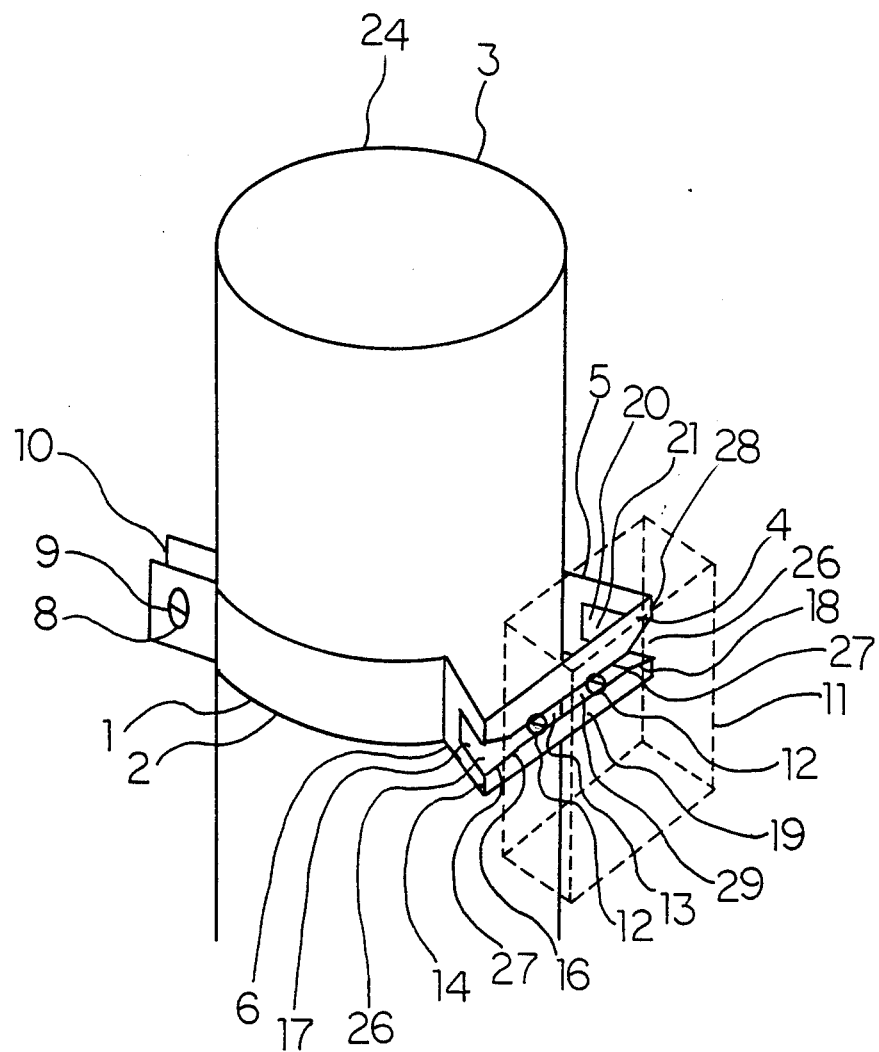
FIG. 3 shows a view of the clamp attached to a pipe, with an electrical junction box attached to the clamp.
Figure 4:
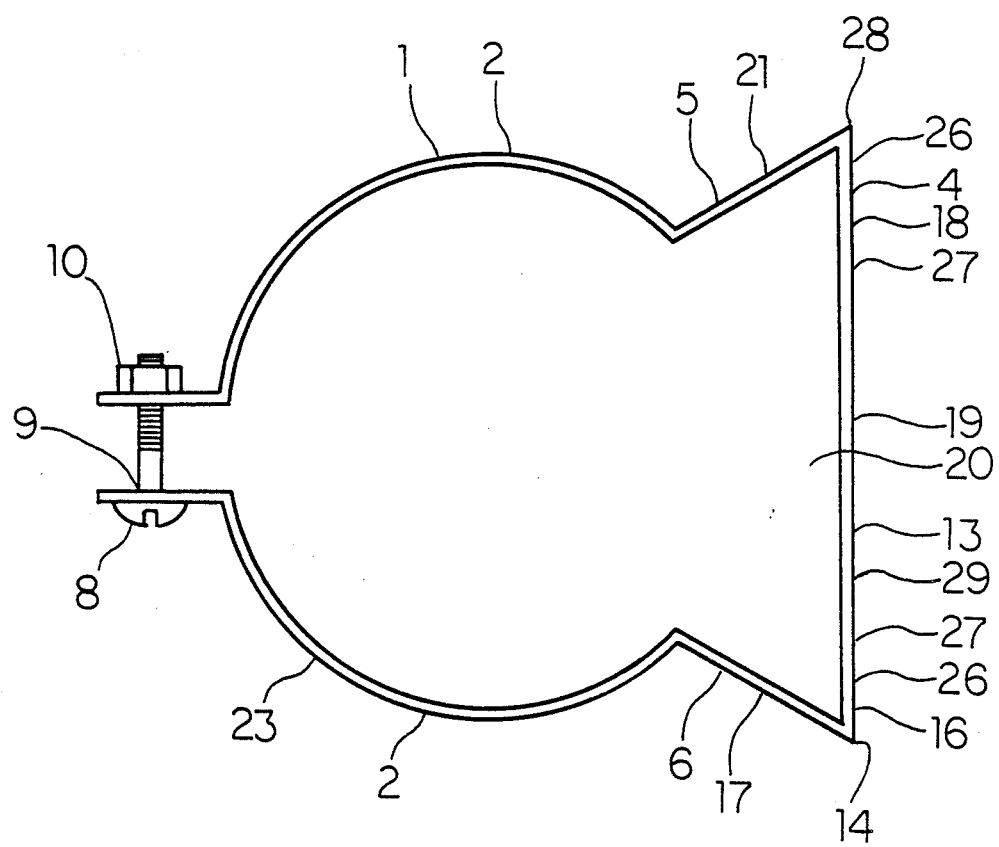
FIG. 4 illustrates a view of said clamp with screw and nut attaching the clamp to the pipe.
Figure 5:
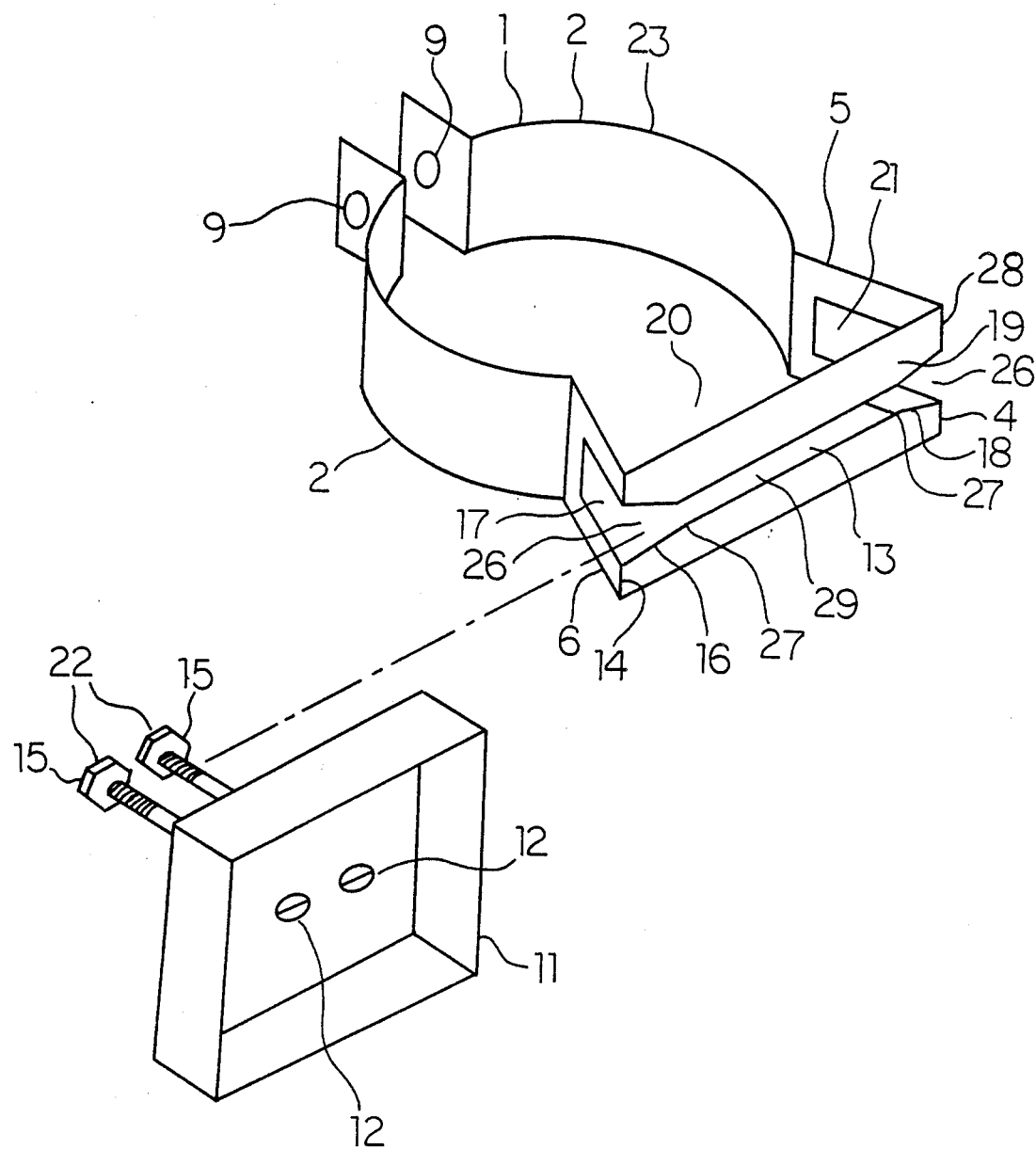
FIG. 5 illustrates a perspective of the clamp with an electrical junction box being attached to the clamp, and pre-assembled screws and nuts being inserted into the mounting slot.

Referring to the drawings of FIGS. 1,2,3,4,5, there is illustrated the present invention of the electrical junction box support clamp 1. The preferred method of manufacture is stamped non-corrosive metal, but not limited to this material. Clamp 1 provides the singular mechanism required for the attachment of electrical junction boxes 11, to a pipe 3, requiring only the means of screws 8 and 12, nuts 10 and 15, for attachment, without requiring the methods of welding, drilling, tapping; or the use of materials, tools, or problems associated with these skills. This is accomplished by attaching Clamp 1 to pipe 3 by separating flexible pipe straps 2, and sliding pipe straps 2 around pipe 3, as shown in FIG. 2. The circumference 23 of pipe straps 2, is designed for standard pipe 3 diameters. Clamp 1 is then quickly, and easily fastened to pipe 3 by means of screw 8 being inserted into screw hole 9, and tightened with nut 10. Screw hole 9 will accept any size screw, or screw type or screw thread within design range. This method of attaching clamp 1 to pipe 3 allows quick and easy adjustment of claim 1 around the circumference 23 of pipe 3, or adjustment along the longitudinal direction of pipe 3, to adjust the final position of the electrical box 11, after it is attached to clamp 1. According to the present invention, clamp 1 allows devices like electrical junction boxes 11, to be quickly and easily fastened, aligned, centered, unfastened, refastened to pipe 3. This is accomplished by the design of a slotted mounting bracket 19, that is attached to pipe straps 2, that has a flat mounting surface 4 that is extended outward from, and separates and supports, the circumference 23 of pipe straps 2, by extensions 6 and 5, which allows electrical junction box 11 to be attached to slotted mounting bracket 19 using the means of screws 12 and nuts 15. Mounting surface 4 and extensions 5 and 6 form a nut positioning area 20 by and between these members. The mounting surface 4 forms an elongated screw adjustment slot 13, that extends across the entire width of mounting surface 4 surface 4 that allows screws 12 to be quickly and easily slid into the mounting surface 4. At both ends 21 of the screw adjustment slot 13, their exists an angled screw guide openings 16, and 18, formed in mounting surface 4, that expands the screw adjustment slot 13 into a wider area 26 on both ends 27 of the screw adjustment slot 13. That helps guide screws 12 through right edge 28, or left edge 14 of the mounting surface 4, and into the screw adjustment slot 13 during attachment of an electrical junction box 11 as in FIG. 5. Adjacent to the screw guide openings 16 or 18, in extension 6 or extension 5 of mounting bracket 19, there exists screw/nut entry openings 17 or 21 that are formed by extension 6 and extension 5, that allows screw 12 and nut 15 assemblies 22, to be slid quickly and easily into the screw adjustment slot 13 and into nut positioning area 20 between pipe 3 and mounting surface 4 for quick and easy attachment of electrical box 11. The left screw/nut entry opening 17 formed in the extension 6, the right screw/nut entry opening 21, formed in extension 5, the left angled screw guide 16, the right angled screw guide opening 18 and the screw adjustment slot 13, together form the mounting bracket slot 29, that allows screw 12 and nut 15 to slide through either edge 14, or edge 28, of the mounting bracket 19 quickly and easily for attachment. The mounting bracket slot 29 is comprised of the series of connected slots and openings 17,16,13,18,21 formed across the front and sides of bracket 19 in the mounting surface 4, and extensions 5 and 6. The mounting bracket slot 29 allows screws 12 and nut 15 assemblies 22 to be slid into either edge 14 or edge 28 of bracket 19, with the screws 12, being guided towards screw adjustment slot 13 by screw guides 16 or 18. Screw guides 16 and 18 also directs nuts 15 into screw/nut positioning area 17. This clamp provides the means of attaching an electrical junction box with a rigid and secure attachment. This clamp 1 provides a method of attaching electrical junction box 11 to pipe 3, both quickly and easily, requiring only the clamp 1 and the means of screws and nuts for attachment comprising the steps of:

(a) separate said pipe straps 2;
(b) fit around said pipe 3;
(c) attach and secure with means of screw 8 and nut 10; and
(d) insert screws 12 through the back of said electrical box 11;
(e) start said nuts 15 on end of said screws 12;
(f) position said nuts 15 and screws 12 in alignment with said mounting bracket slot 29 for either left or right entry;
(g) slide said screw and nut assemblies 22 through either edge 14, or edge 28 of said mounting bracket 19;
(h) slid and position screw and nut assemblies 22 through the adjacent angled screw guide corresponding to the side of entrance either angled screw guide 16 or 18;
(i) slid the screw and nut assembly 22 through the adjacent screw/nut entry hole, either 17 or 21;

(j) position and adjust said box 11, left or right, in the said screw adjustment slot 13;

(k) tighten said screw and nut assemblies 22.

The above method of attachment provides the means of quick and easy attachment of electrical box 11, using only the clamp, screws 12,8 nuts 15,10 for attachment, without requiring any welding, drilling or tapping or the tools, materials or skills, or debris associated with these methods. This method of attachment also allows electrical box 11 to be quickly, easily and correctly centered, with the first attachment attempt. This method also provides the means of adjusting the screws in the screw adjustment slot 13 for quick and easy positioning, centering, and aligning of the device 11, without destroying the galvanized coating off the box 11, as in the method of welding. This method also provides an attachment that does not produce sharp edges inside the box 11, as in the method of welding. This method of attachment accepts any size of screw 12, or any type of screw 12, or any screw thread 12, within design range. This method of attachment does not require any drilling, tapping, or the associated tools, materials, debris or problems. This method of attachment accepts any linear screw pattern on the back of said box, within design range. This method of attachment allows the unfastening and refastening of boxes, without damage to the box 11 as in the welding process. This method of attachment allows quick and easy installation in hazardous areas without having to evacuate of shut down the area.

We claim:

1. A support clamp for securing at least one electrical junction box comprising a pair of flexible straps with means for securing said straps to a pipe, and a mounting bracket secured at an angle to said straps via a pair of extension means; said mounting bracket having a first slot along its width for receiving means for securing said at least electrical junction box.

2. A support clamp as recited in claim 1,
   wherein the means for securing the straps to the pipe comprises an opening, screws and nuts.

3. A support clamp as recited in claim 1,
   wherein the means for securing the electrical junction box to the mounting bracket comprises screws and nuts.

4. A support clamp as recited in claim 1,
   wherein said extension means have a second slot which communicate with said first slot and provide an access for screws and nuts.

* * * * *